(12) United States Patent
Pereira et al.

(10) Patent No.: US 8,566,708 B1
(45) Date of Patent: *Oct. 22, 2013

(54) MERGING ELECTRONIC DOCUMENT REDRAWS

(75) Inventors: Luiz Pereira, New York, NY (US); Olga Belomestnykh, New York, NY (US); Edgard Lindner, New York, NY (US)

(73) Assignee: Google Inc., Mountain View, CA (US)

(*) Notice: Subject to any disclaimer, the term of this patent is extended or adjusted under 35 U.S.C. 154(b) by 93 days.

This patent is subject to a terminal disclaimer.

(21) Appl. No.: 13/006,259

(22) Filed: Jan. 13, 2011

(51) Int. Cl.
*G06F 17/21* (2006.01)

(52) U.S. Cl.
USPC ............... 715/256; 715/273; 715/733

(58) Field of Classification Search
USPC ............... 715/256, 273, 733
See application file for complete search history.

(56) References Cited

U.S. PATENT DOCUMENTS

| | | | |
|---|---|---|---|
| 5,528,743 A | 6/1996 | Tou et al. | |
| 5,930,813 A * | 7/1999 | Padgett et al. | 715/207 |
| 6,006,239 A | 12/1999 | Bhansali et al. | |
| 6,169,999 B1 * | 1/2001 | Kanno | 715/255 |
| 6,185,591 B1 * | 2/2001 | Baker et al. | 715/210 |
| 6,377,354 B1 | 4/2002 | Nguyen et al. | |
| 6,512,531 B1 | 1/2003 | Gartland | |
| 6,636,889 B1 | 10/2003 | Estrada et al. | |
| 6,879,997 B1 | 4/2005 | Ketola et al. | |
| 6,972,748 B1 | 12/2005 | Lang | |
| 7,009,626 B2 | 3/2006 | Anwar | |
| 7,624,145 B2 | 11/2009 | Junuzovic et al. | |
| 7,712,016 B2 | 5/2010 | Jones et al. | |
| 7,792,788 B2 | 9/2010 | Melmon et al. | |
| 7,953,696 B2 | 5/2011 | Davis et al. | |
| 7,958,448 B2 | 6/2011 | Fattic, II et al. | |
| 8,044,961 B2 | 10/2011 | Opstad et al. | |
| 8,065,604 B2 | 11/2011 | Blankinship | |
| 2003/0115268 A1 | 6/2003 | Esposito | |
| 2003/0179230 A1 * | 9/2003 | Seidman | 345/750 |
| 2004/0015781 A1 | 1/2004 | Brown et al. | |
| 2005/0234943 A1 | 10/2005 | Clarke | |

(Continued)

OTHER PUBLICATIONS

DeJean, David, "Online office apps get real: Google Docs vs. ThinkFree vs. Zoho, Web-based suites have become real challengers to desktop applications," Jul. 16, 2008, Computerworld [online]. Retrieved from the Internet:< URL: http://www.computerworld.com/s/article/print/9108799/Online_office_apps_get_real_Google_Docs_vs._ThinkFree_vs._Zoho> (7 pp.).

(Continued)

*Primary Examiner* — Doug Hutton, Jr.
*Assistant Examiner* — Andrew Dyer
(74) *Attorney, Agent, or Firm* — Wolff & Samson, PC (57) ABSTRACT

The subject matter of this document can be implemented in, among other things, a method that includes displaying a visual representation of an electronic document. The method also includes receiving an input to affect a modification of the electronic document, the modification including two or more document change operations, and causing each of the two or more document change operations to be applied to the electronic document. The method also includes determining a redraw approach for redrawing a portion of the visual representation of the electronic document based on the two or more document change operations, such that the redraw approach includes fewer redraws than document change operations. The method further includes performing a redraw of a portion of the visual representation of the electronic document based on the redraw approach.

21 Claims, 5 Drawing Sheets

(56) References Cited

U.S. PATENT DOCUMENTS

| | | | |
|---|---|---|---|
| 2006/0053196 | A1 | 3/2006 | Spataro et al. |
| 2006/0265639 | A1 | 11/2006 | Merrill et al. |
| 2007/0094601 | A1 | 4/2007 | Greenberg et al. |
| 2007/0233811 | A1 | 10/2007 | Rochelle et al. |
| 2007/0239695 | A1 | 10/2007 | Chakra et al. |
| 2009/0192845 | A1 | 7/2009 | Gudipaty et al. |
| 2010/0153948 | A1 | 6/2010 | Schreiber et al. |
| 2010/0241749 | A1 | 9/2010 | Rasmussen et al. |
| 2011/0178981 | A1 | 7/2011 | Bowen et al. |
| 2012/0072819 | A1 | 3/2012 | Lindner |

OTHER PUBLICATIONS

Wikipedia, the free encyclopedia, "Model-View-Controller from Wikipedia, the free encyclopedia (Redirected from Model-view-controller)," Last Modified on Nov. 16, 2010 [online]. Retrieved from the Internet:< URL:http://en.wikipedia.org/wiki/Model%E2%80%93view%E2%80%93controller> (10 pp.).

Citro, Sandy, "Conflict Management for Real-Time Collaborative Editing in Mobile Replicated Architectures," 2007, Australian Computer Society, Inc., Thirteenth Austrailian Computer Science Conference (ACSC2007), pp. 115-124.

Miller, Michael, "Googlepedia: The Ultimate Google Resource, Third edition," 2008, p. 276.

Olav Junker Kjaer, "Timing and Synchronization in JavaScript", Dev. Opera, Sections: "The Basics", "Event Queing", "Long Running Scripts" and "Advice on Timing", Feb. 27, 2007, downloaded from URL: htt//dev.opera.com/articles/view/timing-and-synchronization-in-javascript/, pp. 1-9.

PCT International Search Report corresponding to PCT Application No. PCT/US2011/001417 filed Aug. 11, 2011 (2 pages).

PCT Written Opinion of the International Searching Authority corresponding to PCT Application No. PCT/US2011/001417 filed Aug. 11, 2011 (7 pages).

Quinn, Laura S., "Comparing Online vs. Traditional Office Software, Will desktop or online office software fit your non-profit needs best?" May 21, 2010, courtesy of Idealware, TechSoup.org [online]. Retrieved from the Internet URL:http://www.techsoup.org/learningcenter/software/page11852.cfm (4 pp.).

Tyson, Herb, "Microsoft Word 2007 Bible," 2007, 112-115, 467, 523-525, 798.

Lemonik et al., System and Method for Using a Third-Party Add-On in a Collaborative Online Software Development Environment, unpublished U.S. Appl. No. 13/551,859, filed Jul. 18, 2012, 1-103.

Lemonik et al., System and Method for Using a Third-System and Method for Using a Third-Party Add-On to Manipulate a Document in a Collaborative Online Software Development Environment, unpublished U.S. Appl. No. 13/551,772, filed Jul. 18, 2012, 1-119.

Day-Richter et al., System and Method for Performing Data Management in a Collaborative Development Environment, unpublished U.S. Appl. No. 13/591,734, filed Aug. 22, 2012, pp. 1-101.

Day-Richter et al., System and Method for Managing Remote Procedure Calls Relating to a Third Party Software Application, unpublished U.S. Appl. No. 13/591,851, filed Aug. 22, 2012, pp. 1-98.

Unpublished U.S. Appl. No. 13/166,844, filed Jun. 23, 2011.
Unpublished U.S. Appl. No. 13/224,479, filed Sep. 2, 2011.
Unpublished U.S. Appl. No. 13/224,530, filed Sep. 2, 2011.
Unpublished U.S. Appl. No. 13/224,573, filed Sep. 2, 2011.
Unpublished U.S. Appl. No. 13/224,663, filed Sep. 2, 2011.
Unpublished U.S. Appl. No. 13/224,769, filed Sep. 2, 2011.
Unpublished U.S. Appl. No. 13/224,860, filed Sep. 2, 2011.
Unpublished U.S. Appl. No. 13/297,762, filed Nov. 16, 2011.
Unpublished U.S. Appl. No. 13/274,382, filed Oct. 17, 2011.
Unpublished U.S. Appl. No. 13/282,636, filed Oct. 17, 2011.
Unpublished U.S. Appl. No. 13/282,753, filed Oct. 27, 2011.
Unpublished U.S. Appl. No. 13/493,798, filed Jun. 11, 2012.
Unpublished U.S. Appl. No. 13/493,672, filed Jun. 11, 2012.

Sun, Chengzheng, "Operational Transformation in Real-Time Group Editors: Issues, Algorithms, and Achievements," Proc. of 1998 ACM Conference on Computer-Supported Cooperative Work, Seattle, USA, 1998 pp. 1-10.

Googlepedia: The Ultimate Google Resource, Third Edition, 2008, downloaded from the internet http://techbus.safaribooksonline.com/print?xmlid=9780768686746/ch19, Aug. 21, 2012, pp. 1-24.

Connor, Zoho 4 Everyone, 2008, downloaded from the internet http://techbus.safaribooksonline.com/print?xmlid=9780768687835/ch01lev1sec1, Aug. 21, 2012, pp. 1-17.

\* cited by examiner

MERGING ELECTRONIC DOCUMENT REDRAWS

TECHNICAL FIELD

This document relates to editing electronic documents with a computer system.

BACKGROUND

Electronic document editing applications allow users to create and edit electronic content using various types of computing devices, such as desktop computers, laptop computers, smartphones, and the like. Electronic document editing applications are generally configured to create and edit a specific type of electronic content. For example, word processing applications provide editing functionality with respect to text-based documents, and presentation editing applications are used to create and edit electronic slides and other presentation materials.

Oftentimes, document editing applications are installed on a computing device, and execute locally on the computing device to provide the document editing functionality to a user of the computing device. These locally-installed document editing applications may be referred to as desktop-based document editors, since they are typically installed and executed on a desktop computer. The electronic documents that are created or edited using desktop-based document editors may be stored locally on the computing device, or may be stored on a remote computing device that is connected to the computing device, e.g., via a network.

As an alternative or supplement to desktop-based document editors, online or web-based document editing applications have become more prevalent in recent years. Online document editors may offer similar functionality to that provided by desktop-based document editors, but in the online document editor context, the document editing application is not installed or executed locally on the computing device. Rather, the application is installed and executes on a remote computing device, and the local computing device is simply used as an interface to access the online document editor. For example, the local computing device may execute a web browser that acts as an interface to access a web-based document editor web application.

Online document editors may provide users with a number of advantages compared to desktop-based document editors including, for example, secure remote storage of electronic documents, collaboration features that allow multiple users to access and edit the electronic document at the same time, no local installation of the document editing application on the user's computing device, cross-platform accessibility, etc. In addition, users can typically access their electronic documents from any computer with a web browser and an Internet connection.

SUMMARY

In general, this document describes techniques for reducing the number of redraws that are used by an online document editor to display a visual representation of an electronic document following changes to the electronic document. Unlike desktop-based document editors that generally provide one-to-one access between a user of the desktop-based document editor and the electronic document being edited, online document editors may provide multiple users with simultaneous access to different views of the electronic document. Each user may be presented with a visual representation of the electronic document in a user interface, such as a web browser, and the separate user interfaces may be updated as changes are made to the electronic document. As described herein, the user interfaces may redraw all or portions of the visual representation of the electronic document to reflect changes that have been made to the electronic document by any of the one or more users.

In general, online document editors may provide various commands that allow users to make changes to an electronic document. For example, one such command may be an "Insert Table" command that inserts a table at a specific location within the electronic document. Commands may be performed using a number of basic or fundamental document operations. Example document operations may include inserting characters, removing characters, applying styles, and the like. Using various combinations of these fundamental document operations, an online document editor may provide similar document editing functionality available in desktop-based document editors.

As mentioned, commands typically involve multiple document operations. For example, inserting a new column into a table may involve adding multiple sets of characters to the electronic document, as well as applying styles to the characters in the electronic document. At a basic level, an online document editor may redraw a visual representation of the electronic document following every document operation that is performed as part of a command. However, this may be detrimental to the performance of the online document editor. As such, according to the techniques described herein, the online document editor may reduce or minimize the number of document redraws used to represent updates to the electronic document by intelligently merging two or more redraw operations together into a single redraw.

In a first aspect, a method includes displaying, with an online document editing system, a visual representation of an electronic document. The method also includes receiving an input to affect a modification of the electronic document, the modification including two or more document change operations, and causing each of the two or more document change operations to be applied to the electronic document. The method also includes determining, using the online document editing system, a redraw approach for redrawing a portion of the visual representation of the electronic document based on the two or more document change operations, such that the redraw approach includes fewer redraws than document change operations. The method further includes performing a redraw of the portion of the visual representation of the electronic document based on the redraw approach.

In a second aspect, a computer-readable storage medium includes instructions that, when executed, cause one or more processors to display, with an online document editing system, a visual representation of an electronic document. The computer-readable storage medium also includes instructions to receive an input to affect a modification of the electronic document, the modification including two or more document change operations, and to cause each of the two or more document change operations to be applied to the electronic document. The computer-readable storage medium also includes instructions to determine, using the online document editing system, a redraw approach for redrawing a portion of the visual representation of the electronic document based on the two or more document change operations, such that the redraw approach includes fewer redraws than document change operations. The computer-readable storage medium further includes instructions to perform a redraw of the portion of the visual representation of the electronic document based on the redraw approach.

In a third aspect, a system includes a view that displays a visual representation of an electronic document. The system also includes a document controller that receives an input to affect a modification of the electronic document, the modification including two or more document change operations. The system further includes means for determining a redraw approach for redrawing a portion of the visual representation of the electronic document in response to the input, the redraw approach including fewer redraws than document change operations.

The details of one or more embodiments are set forth in the accompanying drawings and the description below. Other features, objects, and advantages will be apparent from the description and drawings, and from the claims.

BRIEF DESCRIPTION OF DRAWINGS

Like reference symbols in the various drawings indicate like elements.

DETAILED DESCRIPTION

In general, this disclosure describes techniques for reducing the number of redraws that are performed by an online document editor to render a visual representation of an electronic document when changes are made to the electronic document. Determining how and when to perform a redraw may involve a trade-off between system performance and system complexity. On one hand, performing a redraw after every document operation may degrade performance of the online document editor (e.g., based on rendering times, latency, server connectivity, etc.). On the other hand, waiting too long between redraws may increase the system complexity by increasing the queue of uncommitted redraws, and making it more difficult to determine how to merge the redraws correctly and when the redraws should be committed.

Due to the performance issues associated with redrawing a visual representation of the electronic document after every document operation, certain changes made to the electronic document (e.g., changes that do not affect the visible portion of the document displayed on a screen) may not be reflected immediately in the visual representation of the electronic document. Instead, groups of changes may be stored in memory until the visual representation of the electronic document is eventually rendered. According to the techniques described herein, the number of redraws used to render the groups of changes that have been applied to the electronic document may be reduced by intelligently merging at least some of the redraws together.

Figure 1:
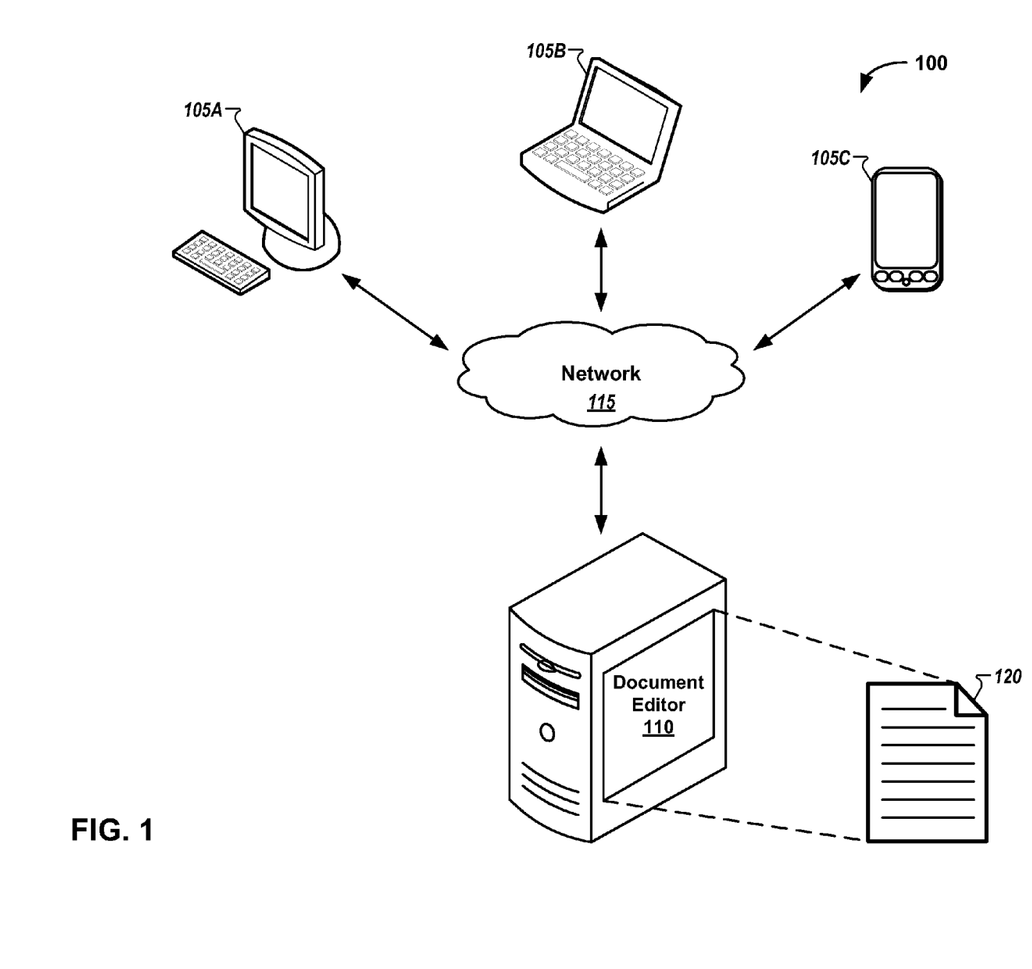
FIG. 1 is a conceptual diagram illustrating an example architecture of an online document editing system.

FIG. 1 is a conceptual diagram illustrating an example architecture 100 of an online document editing system. Example architecture 100 includes a desktop computer client device 105A, a laptop computer client device 105B, and a smartphone client device 105C (collectively "client devices 105"). Other or additional client computing devices (not shown) may also be included in architecture 100.

Client devices 105 are communicatively coupled to an online document editor 110 via network 115. Network 115 may be any type of appropriate wired or wireless network, including for example, the Internet, a local area network (LAN), a wide area network (WAN), or combinations thereof. In some implementations, online document editor 110 may function as a web application server that hosts one or more web applications to provide document editing functionality to client devices 105.

Each of client devices 105 provides one or more user interfaces that are capable of accessing and/or interacting with online document editor 110. For example, in some implementations, client devices 105 may utilize one or more web applications that operate within a web browser executing on each of the respective client devices 105 to access the functionality of online document editor 110. In other implementations, client devices 105 may utilize other types of user interfaces to interact with online document editor 110, such as a dedicated user interface client application that is capable of accessing online document editor 110. Client devices 105 may access online document editor 110 to create or edit an electronic document 120. Online document editor 110 may provide access to electronic document 120, which may be stored locally within the memory of online document editor 110, or on a computing device that is remote from online document editor 110.

In general, changes to electronic document 120 may be affected by any of client devices 105. For example, a user of client device 105A may add content to electronic document 120 by typing text into a keyboard of client device 105A. In another example, a user of client device 105A may add content to electronic document 120 by speaking into a microphone of client device 105A, or by using any other appropriate input mechanism available to client device 105A. In response to the input, client device 105A may communicate the additional content to online document editor 110, which may then modify electronic document 120 as appropriate (e.g., by adding the content to electronic document 120). In response to the modification of electronic document 120, online document editor 110 may communicate the current state of electronic document 120 to each of the respective client devices 105. Such communication of the current state of electronic document 120 may be implemented as a push to client devices 105, or as a pull from client devices 105. Then, each of the respective client devices 105 may update the visual representation of electronic document 120 by redrawing all or portions of the visual representation of the electronic document to reflect the changes that were made to electronic document 120.

Online document editor 110 may utilize a number of fundamental document operations to provide the various document editing features of the document editor. The fundamental document operations may correspond to the smallest changes that may be made to electronic document 120, and may be utilized in various combinations to provide all of the possible document editing functions associated with online document editor 110. The fundamental document operations of a given online document editor 110 may vary, depending on the specific implementation of the editor. For example, the document operations for one word processing document editor may include inserting a character, deleting a character, applying a style, inserting an entity (e.g., a numbered list), and updating an entity. Other implementations for different word processing document editors may include more, fewer, or different document operations. Similarly, different types of document editors (e.g., presentation editors or spreadsheet editors) may include fundamental document operations that are specific to the particular type of document editor.

Combinations of two or more document operations may be referred to as a command. As such, commands correspond to document modifications that make use of two or more fundamental document operations. For example, an "Insert Column in Table" command may utilize multiple "insert character" document operations, and may also utilize multiple "apply style" document operations to insert a column into a table in the electronic document. Commands may correspond to various user inputs (e.g., an "Insert Table" button, or an "Insert Column in Table" menu item, etc.) that allow users to initiate relatively complex document editing functions with relatively minimal effort (i.e., without manually executing each of the document operations that make up a given command).

As described above, rather than performing a redraw of the visual representation of electronic document 120 after each of the fundamental operations is performed in a particular command, online document editor 110 may instead determine an efficient redraw approach that reduces the number of redraws utilized. For example, as will be described in greater detail below, online document editor 110 may store metadata about the various document operations that are performed during execution of the command. Following completion of the command, online document editor 110 may determine which of the document operations performed as part of the command can be combined into merged redraws based on the stored metadata. Then, the visual representation of updated electronic document 120 may be efficiently redrawn using a reduced number of redraws (e.g., by combining two or more of the redraws into a single redraw). In such a manner, the number of redraws that are used to redraw the visual representation of electronic document 120 is less than the number of document operations that were performed as part of the command.

Figure 2:
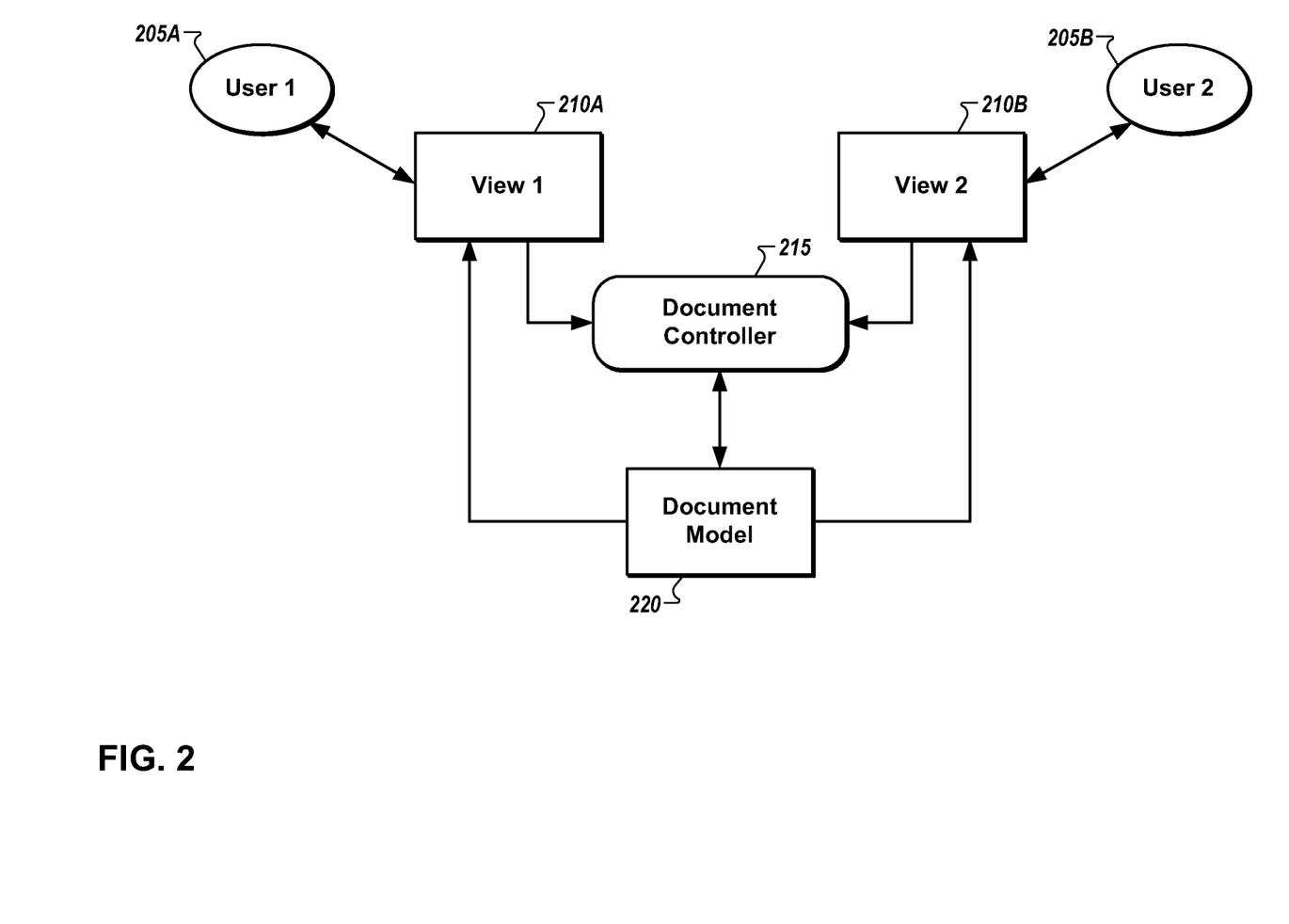
FIG. 2 is a block diagram illustrating example components of an online document editing system.

FIG. 2 is a block diagram illustrating example components of an online document editing system. As shown in the block diagram, an online document editor may be implemented using a Model-View-Controller (MVC) architecture. In the example MVC architecture, document model 220 may be associated with an electronic document 120, first view 210A and second view 210B (collectively "views 210") may be associated with the user interfaces of client devices 105, and document controller 215 may be associated with online document editor 110. In some implementations, the various components of the online document editing system may reside on other devices within the system, or certain functionality may be spread across multiple computing devices within the system. Furthermore, the system may utilize multiple tiers to distribute various components or modules and/or portions of functionality in order to improve system efficiency or to otherwise balance the processing load amongst various devices in the system. As such, it should be understood that the example components as shown are for illustrative purposes only.

The MVC architecture represents one model that may be used to implement an online document editing system. In general, a model in the MVC architecture represents, for example, stored data and various rules that delineate interaction with the data (e.g. access and updates). A view provides a mechanism to render the contents of the model for display to a user. When the model changes, the view may automatically redraw the affected part of the display to reflect the change. The mechanism by which a user interacts with the model is the controller. The controller generally handles user input, instructing the model and view, as applicable, to perform actions in response to the input.

In the context of an online document editing system, document model 220 may be used to manage information related to an electronic document that is accessible to one or more users 205 through one or more views 210. When document model 220 changes its state, it may automatically notify any associated views so that they may be refreshed. In other implementations, views 210 may contain logic that determines when the view should be refreshed, such as on a timed interval, or when the view has available processing cycles to perform redraws that have been queued over time, etc. In other implementations, views 210 may be redrawn based on instructions from document controller 215, which may include logic to determine when views 210 should be refreshed.

Views 210 may be implemented as JAVASCRIPT-based layout engines that operate as web applications within a standard web browser. The layout engine may perform much or all of the functionality of a desktop-based document editor, such as providing features that allow a user to edit the text of an electronic document, insert or delete pictures in the document, insert or remove tabs and tab-stops in the document, insert or remove page breaks, etc.

Views 210 may render document model 220 into a form that is useful for users 205. For example, in the case of a text-based document that includes formatting and layout instructions, document model 220 may take the form of a long string of text that represents the layout and formatting of all the document elements associated with the electronic document as well as the actual content of the electronic document. If rendered directly in that form, document model 220 may be difficult to understand or may even be incomprehensible to users 205. Views 210, therefore, may apply the layout and formatting instructions that are included in document model 220 to the content of the document, and may display the electronic document to users 205 in a more user-friendly format.

In some implementations multiple views may be available for a single document model 220. For example, views may be created for specific types of devices (e.g., small-screen formats, large-screen formats, horizontal orientation, vertical orientation, variable orientation, etc.). Different views may also be available for different types of users or clients (e.g., in the case of a text-based document, various clients may provide different views that render the underlying document in different manners).

Changes to document model 220 may be made as follows. First, one of users 205 provides input to a respective one of views 210 indicating a desired change to the electronic document. The input may be in any appropriate form, such as a button click, typed text, a spoken command, etc. Document controller 215 receives input from one or more of views 210, and initiates a corresponding programmed response, e.g., by translating the input into a specific request and/or calling certain objects associated with document model 220. Document controller 215 may then notify document model 220 of the user action, which may initiate one or more changes to the state of document model 220. Then, views 210 may be updated to reflect the changes to document model 220. In short, document controller 215 generally accepts input from users 205, via one or more views 210, and instructs document model 220 and views 210 to perform actions based on the input.

According to the techniques described herein, views 210 may determine and apply a redraw approach that decreases the number of redraws used to redraw the view, e.g., when changes that entail multiple document operations are requested by a user. To formulate the redraw approach, views 210 may incorporate a set of redraw merging rules that define when it is appropriate to merge two or more document operations into a single redraw, and how such mergers are to be performed. Some examples of redraw merging rules and how they may be applied are described in greater detail below. In some implementations, the set of redraw merging rules may be stored and implemented using views 210 or document controller 215, or may be distributed amongst other components of the document editing system.

As a command is executed, changes are made to document model 220 in the form of multiple fundamental document operations. As the document operations are applied, metadata about the document operations may be captured and stored such that a running collection of applied changes is maintained. The metadata may be stored as part of document model 220, or may be stored using other components within the system. Following either a full or partial completion of the command (e.g., after all or some specific portion of the changes requested as part of the command have been applied), the document editor may analyze the metadata that has been stored about the changes to determine which characters, lines, or sections of the document have been affected. Based on the stored metadata, the document editor may formulate a redraw approach such that the number of redraws used to render the updates to the electronic document are reduced or minimized as compared to the number of document operations that have been applied. In such a manner, the number of redraws that are used to render the updates to the electronic document is less than the number of document operations that were performed as part of the command.

The redraw approach may be based on the metadata stored about the document operations that were applied to the electronic document and on the set of redraw merging rules that specify various document operations that may be redrawn together rather than separately. In general, the rules may be defined such that the minimum number of redraws is used to represent the changes to the electronic document. In some cases, the minimum number of redraws may be reduced to a single redraw that is able to capture all of the changes that have been made.

One example of a redraw merging rule that may be applied to reduce the number of redraws in an online document editing system relates to adjacent character insertions in a collaborative typing context. For example, when one user requests two sets of adjacent character insertions (e.g., a first requested operation is to insert characters "ab" at a given location, and a second requested operation is to insert characters "cd" adjacent to the inserted characters), a non-optimized redraw approach for a collaborative user's screen may include performing two separate redraws of the line—first to redraw the line with the characters "ab" inserted at the appropriate location, and then to redraw the line with the characters "cd" inserted at the appropriate location. However, in an optimized rule set, the redraws for the collaborative user's screen may be merged into a single redraw of the line. Following completion of the command, which in this case includes two separate document operations, the document editor performs the redraws such that the visual representation of the electronic document matches the updated document model. Additional examples of redraw merging rules are provided below.

Figure 3:
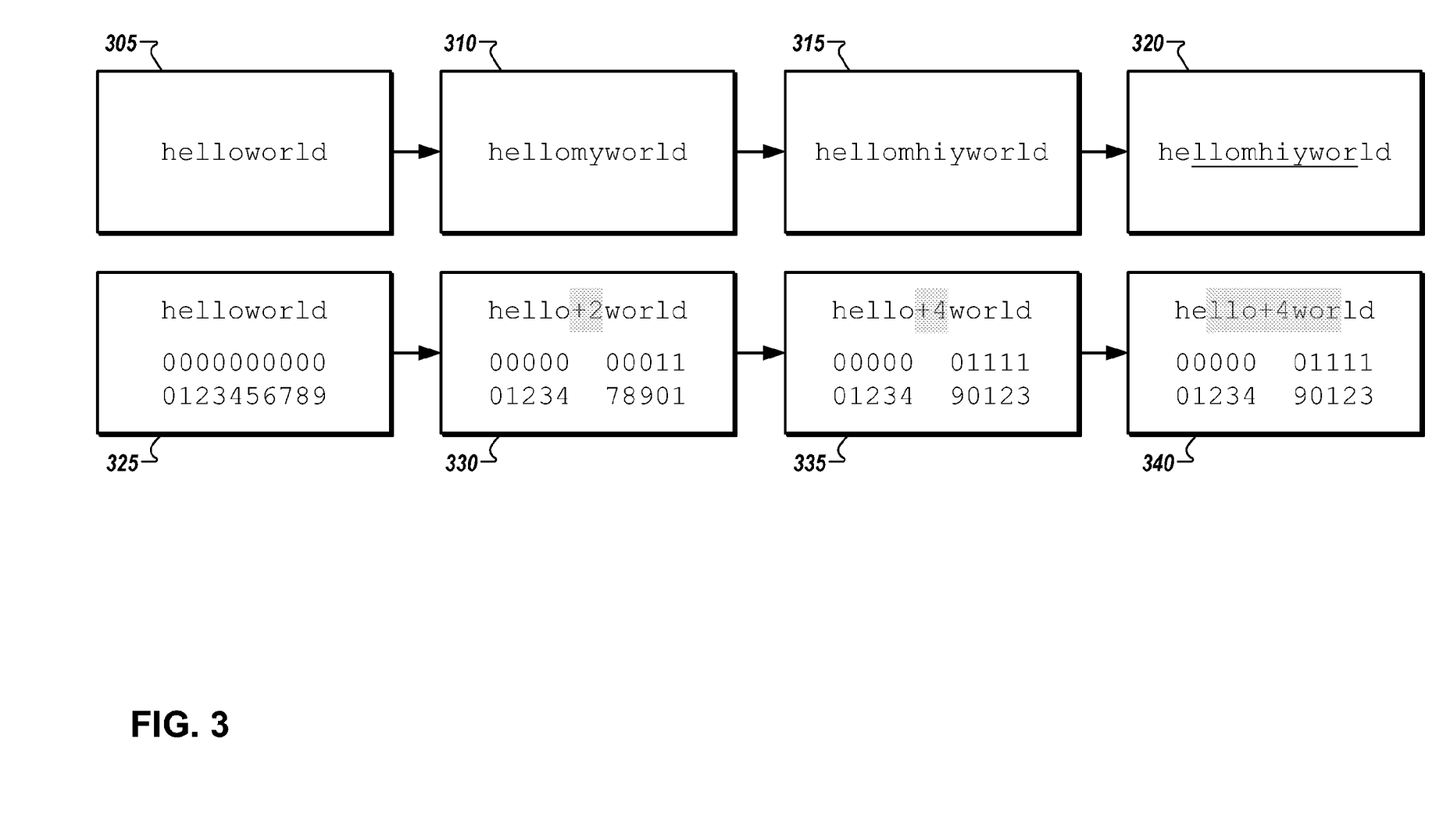
FIG. 3 is a block diagram illustrating example changes to an electronic document.

FIG. 3 is a block diagram illustrating example changes to an electronic document. For illustration purposes, the three modifications to the electronic document as shown in the blocks from left to right in the diagram may be considered as three separate document operations that are part of a single command. The top row, including content blocks 305, 310, 315, and 320, represents visual changes that would be apparent to a user of the electronic document if the changes were rendered in real-time as opposed to being rendered as a batch following completion of the command. The bottom row, including metadata blocks 325, 330, 335, and 340, represents certain metadata that is stored regarding the document operations that have been applied at each of the respective content blocks 305-320 in the top row.

In content block 305, the text "helloworld" is the only text originally present in the electronic document. In corresponding metadata block 325, the layout of the text may be captured and stored as appropriate metadata, such as numbered spacers that correspond to the relative location of each of the characters in the text. For example, numbered spacer "00" corresponds to the first letter in the text, "h", and numbered spacer "07" corresponds to the eight letter in the text, "r".

In content block 310, the text has been modified by inserting the characters "my" after the "hello" text and before the "world" text. In corresponding metadata block 330, the insertion may be represented in metadata as the insertion of two additional spacers following the fifth spacer (numbered "04"), which corresponds to the last character in "hello," and renumbering the remaining spacers accordingly to accommodate the two inserted characters. Upon completion of the command, this metadata standing alone may indicate that the range of spacers numbered "05" through "11" should be redrawn to capture the changes associated with the first character insertion document operation.

In content block 315, the text has again been modified by inserting the characters "hi" between the "m" and the "y" characters that were previously inserted. In corresponding metadata block 335, the second insertion is merged with the first insertion rather than being handled separately. As such, the metadata that is stored regarding how the original document has been modified is simply represented as an insertion of four characters after the "hello" text and before the "world" text. The two insertions are represented as the insertion of four additional spacers following the fifth spacer (numbered "04"), and renumbering the remaining spacers accordingly.

According to one example redraw merging rule of an online document editor, two document operations may be merged together into a single redraw when the operations relate to two adjacent character insertions. According to this particular redraw merging rule, when the command has completed, the visual representation of the electronic document may be redrawn using a single redraw to represent the changes made to the electronic document, even though two separate document operations (i.e., the first insertion and the second insertion) were performed. Upon completion of the command, therefore, the metadata may indicate that the range of spacers numbered "05" through "13" should be redrawn as a single redraw.

In content block 320, the text has again been modified by applying an "underline" style to the "llomhiywor" text in the electronic document. In corresponding metadata block 340, the metadata that is stored may convey that a particular style (i.e., "underline") should be applied to spacers numbered "02" through "11", and therefore, that the range of spacers numbered "02" through "11" should be redrawn. Once again, if another example redraw merging rule states that two document operations may be merged together when the operations relate to adjacent character insertions and/or style applications, then the visual representation of the electronic document may be redrawn using a single redraw to capture all of the updates made to the electronic document, even though three separate document operations were performed. Upon completion of the command, therefore, the metadata may indicate that the range of spacers numbered "02" through "13" should be redrawn as a single redraw. In this manner, the number of document redraws used to represent three separate document operations may be reduced from three down to one.

It should be understood that the redraw merging rules described above are merely two examples of redraw merging techniques that may be applied by an online document editor to reduce the number of redraws that are used to update a visual representation of an electronic document. Other redraw merging rules may also be applied. For example, when characters are deleted from an electronic document, the metadata spacers associated with the deleted text may be removed, and the other spacers may be shifted accordingly. When such metadata spacers are removed, it may indicate that the range of metadata spacers that were affected by the deletion should be redrawn. Once again, if the range of spacers is adjacent to a character insertion operation, the deletion and insertion operations may be merged into a single redraw according to one example redraw merging rule. As another example, overlapping range redraws (e.g., two different styles that are applied to overlapping ranges of metadata spacers) may also be merged into a single document redraw according to another example redraw merging rule.

Other such rules may also be defined for specific implementations, and for various document operations that are available in those specific implementations. For example, rather than focusing redraw merging rules on particular character locations within a document, some implementations may identify a certain line or group of lines in a document that should be redrawn following completion of a command that affects those particular lines. Similarly, some implementations may identify a certain section of a document that should be redrawn following completion of a command that affects that particular section of the document.

Although illustrated above with relatively simple examples of commands that only include two or three document operations, the techniques of this disclosure may be expanded to much more complex commands involving any number of document operations. As just one example, commands that are used to insert one or more columns into a table in an electronic document may involve a very large number of document operations, depending on the number of columns that are inserted and on the number of cells that are affected when the columns are inserted. If a very large number of document operations are performed, the techniques described herein may also lead to storage of large amounts of metadata relating to the document operations that were performed. However, the redraw merging rules may be applied similarly to how they were applied in the simpler example to ensure that fewer document redraws are utilized to render the visual representation of the modified electronic document.

Similarly, the redraw merging rules may be applied to allow "undo" commands to seamlessly be applied to an electronic document, and for the corresponding redraws of the electronic document to be reduced in a similar manner. Continuing with the example above, a command to undo an insert of one or more columns into a table may involve many different document operations, and as such, involve storage of large amounts of metadata relating to the document operations. However, the redraw merging rules may be applied similarly to how they were applied in the simpler example to ensure that fewer document redraws are utilized to render the visual representation of the modified electronic document.

Figure 4:
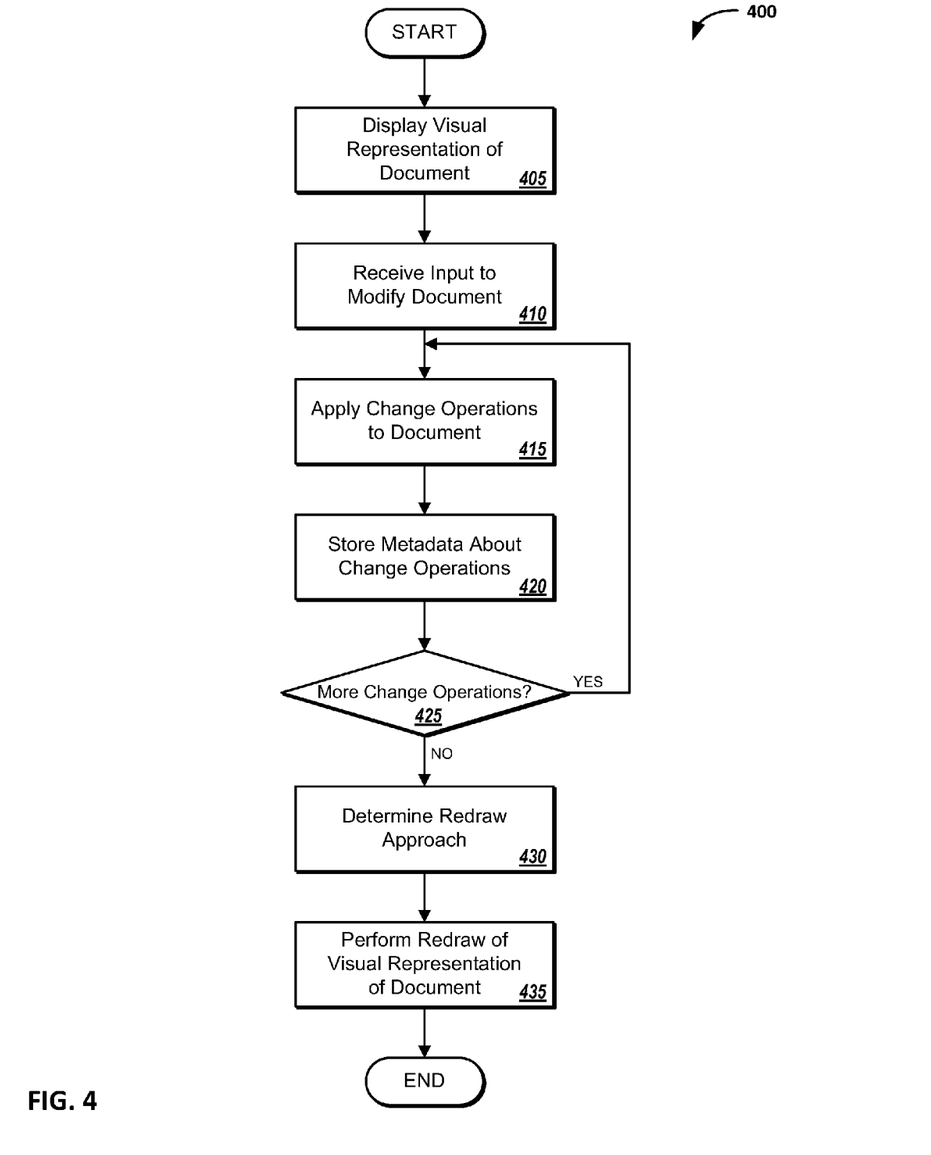
FIG. 4 is a flow diagram illustrating an example process for performing a redraw of a visual representation of an electronic document.

FIG. 4 is a flow diagram illustrating an example process 400 for performing a redraw of a visual representation of an electronic document. The operations in process 400 may be performed by one or more computing devices, and by one or more processes or components executing on the computing devices. For example, views 210 may be configured to perform the operations of process 400 to redraw at least a portion of the visual representation of document model 220 in response to an input by a user. However, it should be understood that other components, or combinations of components, may be used to perform example process 400.

Process 400 begins by displaying a visual representation of an electronic document (405). The visual representation may be displayed within a user interface that is accessible by a user of a web-based document editor, such as in a document editing web application executing in a browser of a computing device. The electronic document itself may contain an unformatted string of text that describes the contents, formatting, and layout of the electronic document, while the displayed visual representation of the electronic document may present the contents of the electronic document according to the formatting and layout instructions that are included in the electronic document. In some implementations, the visual representation of the electronic document may be the same as the underlying electronic document (e.g., a visual representation of the text of the electronic document, including the contents, formatting, and layout instructions without any of the formatting or layouts applied).

Continuing with process 400, an input is received that affects a modification of the electronic document (410). For example, a user may select a section of text in the visual representation, and may click a button in the user interface to format the selected section, e.g., to apply a "bold" style to the selected text. The user may also utilize one or more keyboard combinations to apply the "bold" style to the selected section (e.g., by holding down a "Control" key and pressing a "B" key). As another example, the user may choose a command from a menu of the user interface. For example, the user may click a menu item that activates an "Insert Table" command, which in turn initiates a series of document operations to insert a table into the electronic document. In this context, a command is a set of two or more document operations that may be applied to modify the electronic document.

Depending on the input, two or more document operations may be utilized to modify the electronic document in the manner desired by the user. In process 400, each of the document operations are applied to the electronic document (415). Continuing with the example above, if the user clicks an "Insert Table" menu item, various document operations such as character insertions, section formatting, and the like may be performed to affect the changes to the electronic document such that a table is inserted as requested by the user. Following the changes, the electronic document is in an updated state that has not yet been visually represented in the view.

Process 400 may also store information, e.g., metadata, about the document operations (420). In some implementations, metadata about each change may be stored as each of the document operations is performed. In other implementations, the metadata relating to each of the document operations may be collected as the document operations are performed, and the metadata may be stored after all or some defined set of operations have been completed. The metadata may provide various types of information about the document operations that allow the process to keep track of the various document operations that have been requested and that have been performed. In some implementations, the metadata may allow all or a portion of the document operations to be reversed or undone, such as when a user clicks an "Undo"

button or enters a keyboard combination indicating a desire to undo some or all of the previous actions.

If any additional document operations are to be performed (425), steps 415 and 420 may be repeated. Once it is determined that no additional document operations are to be performed as part of the command, a redraw approach is determined (430). As described above, the redraw approach may be determined based on the metadata that was stored about the various document operations, and may include fewer document redraws than the number of document operations that were performed. In such a manner, the number of redraws that are used to redraw an electronic document is less than the number of document operations that were performed as part of the command. For example, if a command including three different document operations was executed, and two of the document operations were capable of being merged, then the redraw approach may include two redraws instead of three. Similarly, if all three of the document operations were capable of being merged, then the redraw approach would identify a single redraw to capture the changes made to the electronic document.

As one example, if a user chooses to insert the characters "my" into a line of text, and also chooses to insert the characters "hi" in the same line, such changes would typically correspond to at least two document operations. In this example, since both of the character insertions occurred on the same line, the document editor may identify that the line only needs to be redrawn once to accommodate both document operations. As such, the redraw approach may be to redraw the line, or a portion of the line, in the electronic document to accommodate both the "my" and "hi" character insertions in a single redraw.

After the redraw approach has been determined, process 400 continues by performing the redraw of the visual representation of the electronic document (435). Continuing with the example above, even though two separate document operations are performed (inserting "my" and inserting "hi" into the electronic document), only a single redraw is utilized to present the visual representation of the updated electronic document in the view.

According to the techniques described herein, process 400 may be applied for each separate view associated with the electronic document. For example, when a user of a first view updates the electronic document by inserting characters into the electronic document, the underlying electronic document is updated as described above. Metadata about the changes may be stored by the view, the document controller, or with the electronic document itself such that each of the views associated with the electronic document may separately determine an appropriate redraw approach that reduces the number of redraws utilized to perform the redraw of the visual representation of the electronic document.

Figure 5:
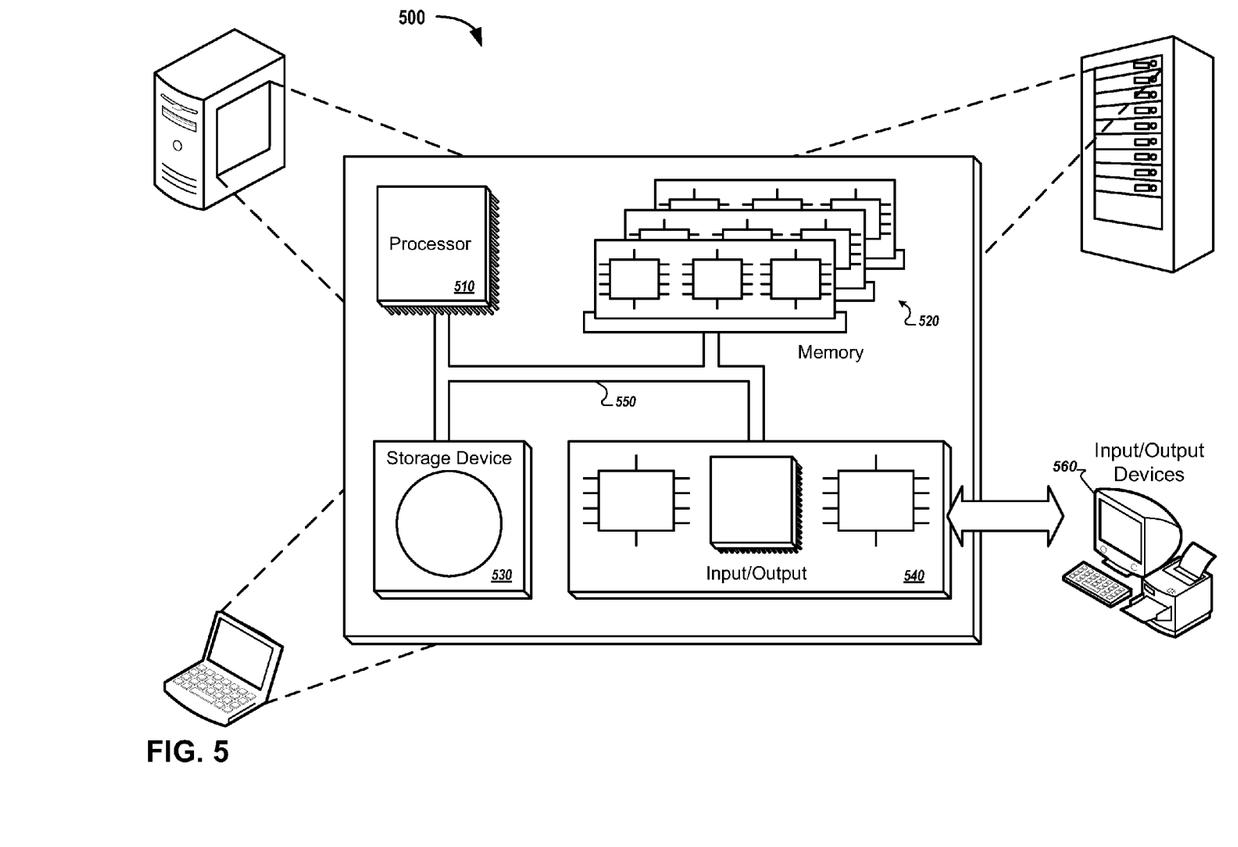
FIG. 5 is a conceptual diagram illustrating example components of a computing system that may be used to implement the techniques described in this document.

FIG. 5 is a conceptual diagram illustrating one example of components of a computing system 500 that may be used to implement the techniques described herein. As depicted in FIG. 5, computing system 500 may include various types of computing devices. For example, a desktop computer, a laptop computer, a network server, or a mainframe computer. Although not depicted in FIG. 5, devices incorporated in computing system 500 may also or alternatively include any number of other devices configured to compute and/or communicate via a network, including mobile devices such as mobile phones, personal digital assistants, smart phones, or other mobile devices. Any of these computing devices may be representative of client devices 105 and online document editor 110 depicted in FIG. 1.

System 500 includes a processor 510, a memory 520, a storage device 530, and an input/output component 540. Each of components 510, 520, 530, and 540 may be interconnected via a system bus 550 for inter-component communications. Processor 510 may be configured to process instructions for execution within system 500. Processor 510 may be a single threaded processor, or may be a multi-threaded processor configured to process various instructions in parallel simultaneously. Processor 510 may be capable of processing instructions stored in memory 520 or instructions stored on storage device 530. In one example, processor 510 may be configured to process instructions to cause online document editor 110 to operate on system 500 consistent with the techniques described herein.

System 500 further includes peripheral devices 560. Peripheral devices 560 may include, for example, a monitor or other display device for presentation of visual information to a user of system 500. Peripheral devices 560 may further include one or more input devices to enable a user to input data to system 500, e.g., a keyboard, mouse, touchpad, trackpad, etc. Peripheral devices 560 may further include printers or other devices to output information. In one example, processor 510 may be configured to process instructions to cause a visual representation of electronic document 120 to be displayed to a user via a display of peripheral devices 560.

Memory 520 may be configured to store information within system 500 during operation. Memory 520 may be described as a computer-readable storage medium. In some examples, memory 520 is a temporary memory, meaning that a primary purpose of memory 520 is not long-term storage. Memory 520 may also be described as a volatile memory, meaning that memory 520 does not maintain stored contents when the computer is turned off. Examples of volatile memories include random access memories (RAM), dynamic random access memories (DRAM), static random access memories (SRAM), and other forms of volatile memories known in the art.

In some examples, memory 520 may be used to store program instructions for execution by processor 510. In other examples, memory 520 may be used by software or applications running on system 500 to temporarily store information during program execution.

Storage device 530 may also be described as a computer-readable storage medium. In contrast to memory 520, storage device 530 may be configured to store larger amounts of information than memory 520. Storage device 530 may further be configured for long-term storage of information. In some examples, storage device 530 is a non-volatile memory component. In contrast with a volatile memory component, a non-volatile memory may store data whether or not power is supplied to storage device 530. Examples of non-volatile storage devices include magnetic hard discs, optical discs, floppy discs, Flash memories, and other forms of electrically programmable memories (EPROM) or electrically erasable and programmable (EEPROM) memories.

The techniques described here may be implemented according to a computing system 500 as described with respect to FIG. 5 in any combination of digital electronic circuitry, computer hardware, firmware, software, or any combination of digital electronic circuitry, computer hardware, firmware, software. For example, any of the techniques described herein may be implemented via executable program instructions stored in a computer-readable storage medium (e.g., memory 520 and/or storage device 530) that are readable by processor 510 to cause processor 510 to perform the techniques of this disclosure. In other examples, some or all of the techniques of this disclosure may instead or in addition be implemented via dedicated hardware configured for a specific purpose, e.g., a field programmable gate array (FPGA), application specific integrated circuit (ASIC), digital signal processor (DSP), or another like device. The term "processor" or "processing circuitry" may generally refer to any of the foregoing logic circuitry, alone or in combination with other logic circuitry, or any other equivalent circuitry.

Such hardware, software, and firmware may be implemented within the same device or within separate devices to support the various operations and functions described in this disclosure. In addition, any of the described units, modules, or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The described features can be implemented advantageously in one or more computer programs that are executable on a programmable system including at least one programmable processor coupled to receive data and instructions from, and to transmit data and instructions to a computer-readable storage medium. A computer program can be written in any form of programming language, including compiled or interpreted languages, and it can be deployed in any form, including as a stand-alone program or as a module, component, subroutine, or other unit suitable for use in a computing environment.

In some examples, computer-readable storage media may comprise non-transitory media. The term "non-transitory" may indicate that the storage medium is not embodied in a carrier wave or a propagated signal. In certain examples, a non-transitory computer-readable storage medium may store data that can, over time, change (e.g., in RAM or cache).

The described features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as described above. The relationship of client and server arises by virtue of computer programs running on the respective computers and having a client-server relationship to each other.

A number of embodiments have been described. Nevertheless, it will be understood that various modifications may be made without departing from the spirit and scope of the disclosure. For example, much of this document has been described with respect to a word processing online document editor, but the techniques described herein may also be applied to other online document editors, such as presentation editors, spreadsheet editors, and the like. As another example, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other embodiments are within the scope of the following claims.

What is claimed is:

1. A method comprising:
   displaying, with an online document editing system, a visual representation of an electronic document;
   receiving an input to affect a modification of the electronic document, the modification comprising two or more document change operations;
   causing each of the two or more document change operations to be applied to the electronic document;
   determining, using the online document editing system, a redraw approach for redrawing a portion of the visual representation of the electronic document based on the two or more document change operations, the redraw approach comprising fewer redraws than document change operations;
   performing a first redraw of the portion of the visual representation of the electronic document based on the redraw approach;
   tracking all document change operations including the two or more document change operations;
   receiving undo commands to undo a portion of all of the document change operations after the performing a first redraw, wherein the portion of all of the document change operations is less than all of the document change operations; and
   performing a second redraw of a portion of the visual representation of the electronic document to implement the undo commands by applying merging rules to reverse a portion of the document change operations, wherein the merging rules provide fewer redraws than the number of undo commands.

2. The method of claim 1, further comprising storing update information that corresponds to each of the two or more document change operations, and wherein determining the redraw approach is based on the stored update information.

3. The method of claim 1, wherein the redraw approach comprises a single redraw associated with the two or more document change operations.

4. The method of claim 1, wherein the performing a first redraw comprises a single redraw.

5. The method of claim 1, wherein determining the redraw approach comprises identifying two or more redraws that are combinable, and merging the combinable redraws into a single redraw.

6. The method of claim 1, wherein determining the redraw approach comprises identifying a minimum number of redraws to visually represent the modification of the electronic document.

7. The method of claim 1, wherein multiple visual representations of the electronic document are simultaneously displayed to multiple users accessing the online document editing system.

8. The method of claim 1, wherein the two or more document change operations comprise one or more of inserting characters into the electronic document, removing characters from the electronic document, and applying styles to portions of the electronic document.

9. The method of claim 1 wherein receiving an input to affect a modification of the electronic document comprises receiving an input to affect a modification of text within the electronic document, and wherein causing each of the two or more document change operations to be applied to the electronic document comprises causing each of the two or more document change operations to be applied to the text within electronic document, the method further comprising:

storing metadata associated with each of the two or more document change operations, wherein the stored metadata comprises a plurality of numbered spacers, each numbered spacer corresponding to a relative location of a respective character in the text within the electronic document.

10. A non-transitory computer-readable medium comprising instructions that, when executed, cause one or more processors to:

display, with an online document editing system, a visual representation of an electronic document;

receive an input to affect a modification of the electronic document, the modification comprising two or more document change operations;

cause each of the two or more document change operations to be applied to the electronic document;

determine, using the online document editing system, a redraw approach for redrawing a portion of the visual representation of the electronic document based on the two or more document change operations, the redraw approach comprising fewer redraws than document change operations;

perform a first redraw of the portion of the visual representation of the electronic document based on the redraw approach;

track all document change operations including the two or more document change operations;

receive undo commands to undo a portion of all of the document change operations after performing the first redraw, wherein the portion of all of the document change operations is less than all of the document change operations; and perform a second redraw of a portion of the visual representation of the electronic document to implement the undo commands by applying merging rules to reverse a portion of the document change operations, wherein the merging rules provide fewer redraws than the number of undo commands.

11. The non-transitory computer-readable medium of claim 10, wherein the computer-readable storage medium further comprises instructions that, when executed, cause one or more processors to store update information that corresponds to each of the two or more document change operations, and wherein determining the redraw approach is based on the stored update information.

12. The non-transitory computer-readable medium of claim 10, wherein the redraw approach comprises a single redraw associated with the two or more document change operations.

13. The non-transitory computer-readable medium of claim 10, wherein performing the first redraw comprises a single redraw.

14. The non-transitory computer-readable medium of claim 10, wherein determining the redraw approach comprises identifying two or more redraws that are combinable, and merging the combinable redraws into a single redraw.

15. The non-transitory computer-readable medium of claim 10, wherein determining the redraw approach comprises identifying a minimum number of redraws to visually represent the modification of the electronic document.

16. The non-transitory computer-readable medium of claim 10, wherein multiple visual representations of the electronic document are simultaneously displayed to multiple users accessing the online document editing system.

17. The non-transitory computer-readable medium of claim 10, wherein the two or more document change operations comprise one or more of inserting characters into the electronic document, removing characters from the electronic document, and applying styles to portions of the electronic document.

18. A system comprising:

a memory configured to store:
a view that displays a visual representation of an electronic document;
a document controller that receives an input to affect a modification of the electronic document, the modification comprising two or more document change operations; and a processor configured to:
determine a redraw approach for redrawing a portion of the visual representation of the electronic document in response to the input, the redraw approach comprising fewer redraws than document change operations;
perform a first redraw of the portion of the visual representation of the electronic document based on the redraw approach;
track all document change operations including the two or more document change operations;
receive undo commands to undo a portion of all of the document change operations after performing the first redraw, wherein the portion of all of the document change operations is less than all of the document change operations; and
perform a second redraw of a portion of the visual representation of the electronic document to implement the undo commands by applying merging rules to implement the undo commands by applying merging rules to reverse a portion of the document change operations, wherein the merging rules provide fewer redraws than the number of undo commands.

19. The system of claim 18, wherein the view performs a redraw of the portion of the visual representation of the electronic document based on the redraw approach.

20. The system of claim 18, wherein the document controller causes each of the two or more document change operations to be applied to the electronic document.

21. The system of claim 18, wherein determining the redraw approach comprises identifying two or more redraws.

* * * * *